(12) United States Patent
Chiang et al.

(10) Patent No.: US 11,856,194 B2
(45) Date of Patent: Dec. 26, 2023

(54) METHOD AND APPARATUS OF SIMPLIFIED TRIANGLE MERGE MODE CANDIDATE LIST DERIVATION

(71) Applicant: HFI Innovation Inc., Zhubei (TW)

(72) Inventors: Man-Shu Chiang, Hsinchu (TW); Tzu-Der Chuang, Hsinchu (TW); Chih-Wei Hsu, Hsinchu (TW); Ching-Yeh Chen, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 17/415,313

(22) PCT Filed: Dec. 20, 2019

(86) PCT No.: PCT/CN2019/127006
§ 371 (c)(1),
(2) Date: Jun. 17, 2021

(87) PCT Pub. No.: WO2020/125752
PCT Pub. Date: Jun. 25, 2020

(65) Prior Publication Data
US 2022/0070456 A1 Mar. 3, 2022

Related U.S. Application Data

(60) Provisional application No. 62/784,570, filed on Dec. 24, 2018, provisional application No. 62/783,244, filed on Dec. 21, 2018.

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS 9,282,338 B2   3/2016   Zheng et al.
9,609,347 B2   3/2017   Thirumalai et al.
(Continued)

FOREIGN PATENT DOCUMENTS

CN   104717513 A   6/2015
CN   108781285 A   11/2018
(Continued)

OTHER PUBLICATIONS

International Search Report dated Mar. 20, 2020, issued in application No. PCT/CN2019/127006.
(Continued)

*Primary Examiner* — Lindsay J Uhl
(74) *Attorney, Agent, or Firm* — Oblon, McClelland, Maier & Neustadt, L.L.P.

(57) ABSTRACT

A method and apparatus of Inter prediction for video coding using a target Merge mode comprising a triangle Merge mode are disclosed. According to this method, a current block is partitioned into a first region and a second region using the target partition. A candidate list is determined. Two candidates are determined for the two regions by deriving two target candidates from the candidate list. When a selected target candidate is a uni-prediction candidate, the selected target candidate is used as one candidate; and when the selected target candidate is a bi-prediction candidate, motion information associated of the selected target candidate with List 0 or List 1 is used as one candidate. The current block or current motion information associated with the current block is encoded or decoded according to the
(Continued)

candidate list. The candidate list is used to derive the first candidate and the second candidate.

6 Claims, 7 Drawing Sheets

(51) Int. Cl.
    *H04N 19/159*     (2014.01)
    *H04N 19/176*     (2014.01)

(56) References Cited

U.S. PATENT DOCUMENTS

| | | |
|---|---|---|
| 2017/0238005 A1 | 8/2017 | Chien et al. |
| 2017/0332099 A1 | 11/2017 | Lee et al. |
| 2019/0104304 A1 | 4/2019 | Lee et al. |
| 2021/0092379 A1* | 3/2021 | Zhang ............... H04N 19/105 |
| 2021/0266539 A1* | 8/2021 | Lee ............... H04N 19/119 |
| 2021/0281859 A1* | 9/2021 | Zhang ............... H04N 19/109 |
| 2022/0103809 A1* | 3/2022 | Park ............... H04N 19/52 |
| 2022/0191487 A1* | 6/2022 | Kuo ............... H04N 19/176 |

FOREIGN PATENT DOCUMENTS

| | | |
|---|---|---|
| WO | 2012/097376 A1 | 7/2012 |
| WO | 2018/128466 A1 | 7/2018 |
| WO | 2018/132380 A1 | 7/2019 |

OTHER PUBLICATIONS

Liao, R.L., et al.; "CE10.3.1.b: Triangular prediction unit mode;" Joint Video Exploration Team (JVET) of ITU-T SG 16 WP 3 and ISO/IEC JTC 1/SC 29/WG 11; Oct. 2018; pp. 1-236.

Chinese language office action dated Nov. 20, 2020, issued in application No. TW 108146896.

* cited by examiner

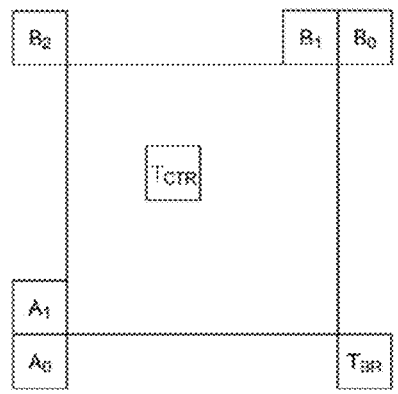
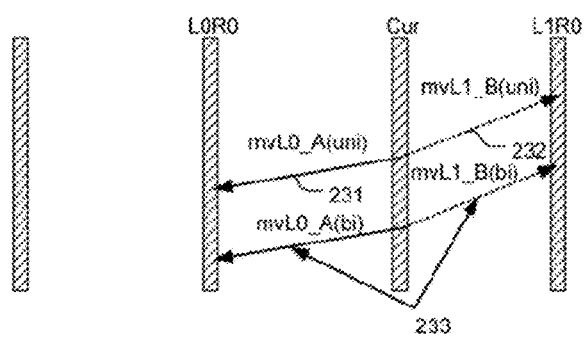
FIG.1
FIG.2

METHOD AND APPARATUS OF SIMPLIFIED TRIANGLE MERGE MODE CANDIDATE LIST DERIVATION

CROSS REFERENCE TO RELATED APPLICATIONS

The present invention claims priority to U.S. Provisional Patent Application, Ser. No. 62/783,244, filed on Dec. 21, 2018 and U.S. Provisional Patent Application, Ser. No. 62/784,570, filed on Dec. 24, 2018. The U.S. Provisional Patent Applications are hereby incorporated by reference in their entireties.

FIELD OF THE INVENTION

The present invention relates to Inter prediction for video coding using a target Merge mode comprising the triangle Merge mode. In particular, the present invention discloses candidate list derivation for the target Merge mode.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 1 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:
1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidates. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 2 illustrates an example of the derivation process for combined bi-predictive Merge candidate. The candidate set 210 corresponds to an original candidate list, which includes mvL0_A, ref0 (231) in L0 and mvL1_B, ref0 (232) in L1. A bi-prediction MVP 233 can be formed by combining the candidates in L0 and L1.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 3, where candidate list 310 corresponds to an original candidate list and candidate list 320 corresponds to the expanded candidate list including two generated bi-prediction MVPs.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

When a PU is coded in Intra mode, the Intra prediction method only exploits one reference tier (or line) adjacent to the current prediction unit (PU) and one of the Intra prediction modes to generate the predictors for the current PU. The reference tier adjacent to the current prediction unit (PU) means the reference L-shape reconstructed samples, which are used for Intra prediction. For Intra prediction modes, the spatial neighboring reconstructed pixels can be used to generate the directional prediction. There are up to 35 directions in HEVC. Out of all 35 intra prediction modes in HEVC, 3 modes are considered as most probable modes (MPM) for predicting the Intra prediction mode in the current prediction block. Three modes are selected as the MPM set. For example, the MPM set comprises the Intra prediction modes used in the left prediction block and in the above prediction block. In case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 5. In FIG. 5, there are all together 33 directional modes, so H, H+1~H+8, H−1~H−7, V, V+1~V+8, V−1~V−8 are used. This system can be expanded to a general case, where horizontal and vertical modes are represented as H and V modes. For other directional modes, they can be represented either as H+k or V+k modes, where k=±1, ±2, etc. For example, if 65 directional modes are used, k can be range from ±1 to ±16.

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (1)$$

An example of the four-parameter affine model is shown in FIG. 6, where block 610 corresponds to the current block and block 620 corresponds to the reference block. The transformed block is a rectangular block. The motion vector field of each point in this moving block can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

In the above equations, $(v_{0x}, v_{0y})$ is the control-point motion vector (i.e., $v_0$) at the upper-left corner of the block, and $(v_{1x}, v_{1y})$ is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 7 illustrates the neighbouring block set used for deriving the corner-derived affine candidate. As shown in FIG. 7, $\bar{v}_0$ corresponds to a motion vector of the block V0 at the upper-left corner of the current block 710, which is selected from the motion vectors of the neighbouring block a0 (referred as the above-left block), a1 (referred as the inner above-left block) and a2 (referred as the lower above-left block). The $\bar{v}_1$ corresponds to motion vector of the block V1 at the upper-right corner of the current block 710, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 710, which is selected from the motion vectors of the neighbouring block c0 (referred as the left block) and c1 (referred as the left-bottom block). In the example of FIG. 7, the neighbouring blocks (a0, a1, a2, b0, b1, b2, c0 and c1) used to construct the control point MVs for affine motion model are referred as a neighbouring block set in this disclosure.

In ITU-T13-SG16-C-1016, an affine Merge mode is also proposed. If current is a Merge PU, the neighbouring five blocks (c0, b0, b1, c1, and a0 blocks in FIG. 7) are checked to determine whether one of them is affine Inter mode or affine Merge mode. If yes, an affine flag is signalled to indicate whether the current PU is affine mode. When the current PU is coded in affine Merge mode, it gets the first block coded with affine mode from the valid neighbour reconstructed blocks. The selection order for the candidate block is from left, above, above-right, left-bottom to above-left (i.e., c0→b0→b1→c1→a0) as shown in FIG. 7. The affine parameter of the first affine coded block is used to derive the $v_0$ and $v_1$ for the current PU.

In JVET-K0115 (S. Jeong, et al., "CE4 Ultimate motion vector expression in J0024 (Test 4.2.9)", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "Description of SDR, HDR and 360° video coding technology proposal considering mobile application scenario by Samsung, Huawei, GoPro, and HiSilicon", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 8A illustrates an example of UMVE search process for a current block 812 in the current frame 810. Frame 820 in reference list L0 and frame 830 in reference list L1 correspond to the two references for bi-prediction.

Line 840 corresponds to a line through the centre of the current block 812 and two corresponding pixels in frames 820 and 830. The search is performed around the centre points associated with line 840 (e.g. lines 842 and 844). In order to simplify the search process, only specific locations around the centre point vertically and horizontally will be searched as shown in FIG. 8B for L0 reference (850) and L1 reference (852). UMVE is used for either Skip or Merge modes with a proposed motion vector expression method. UMVE re-uses the same Merge candidate as VVC (versatile video coding) standard being developed. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This proposed technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code '11' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 1.

TABLE 1

| Base candidate IDX | 0 | 1 | 2 | 3 |
| --- | --- | --- | --- | --- |

Distance index specifies motion magnitude information and indicate the pre-defined offset from the starting point. An offset is added to either horizontal component or vertical component of starting MV. The relation of distance index and pre-defined offset is specified in Table 2.

TABLE 2

| Distance IDX | 0 | 1 | 2 | 3 | 4 | 5 | 6 | 7 |
| --- | --- | --- | --- | --- | --- | --- | --- | --- |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown in Table 3.

TABLE 3

| Direction IDX | 00 | 01 | 10 | 11 |
| --- | --- | --- | --- | --- |
| x-axis | + | − | N/A | N/A |
| y-axis | N/A | N/A | + | − |

To reduce the encoder complexity, block restriction is applied. If either width or height of a CU is less than 4, UMVE is not performed.

Triangular Prediction Unit Mode Technique

The concept of the triangular prediction unit mode is to introduce a triangular partition for motion compensated prediction. As shown in FIG. 9, it splits a CU into two triangular prediction units, in either diagonal 910 or inverse diagonal direction 920. Each triangular prediction unit in the CU is inter-predicted using its own uni-prediction motion vector and reference frame index to generate prediction from a uni-prediction candidate. An adaptive weighting process is performed to the adjacent edge (e.g. diagonal edge) after predicting the triangular prediction units to get the final prediction of current CU. Then, the transform and quantization process are applied to the whole CU. It is noted that this mode is only applied to Skip and/or Merge modes. The triangular prediction unit mode is also referred as triangle partition mode or triangle Merge mode in this disclosure. Triangle Merge mode can be extended to splitting whole CU into two partitions (also referred to as two regions) with a partition straight line, represented by an angle and/or a distance between the partition straight line and CU center.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

$1^{st}$ weighting factor group: {7/8, 6/8, 4/8, 2/8, 1/8} and {7/8, 4/8, 1/8} is used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

One weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. An example is shown in FIG. 10, where weighting 1010 is shown for the luma block and weighting 1020 is shown for the chroma block.

The candidate list derivation for the triangle Merge mode is very complex. The candidate list derivation involves multiple pruning processes. Also, the candidate list derivation involves heavy data dependency and is difficult to speed up the process. Therefore, it is desirable to develop simplified candidate list derivation for triangle Merge mode or the extensions of triangle Merge mode.

BRIEF SUMMARY OF THE INVENTION

A method and apparatus of Inter prediction for video coding using triangle Merge mode are disclosed. According to this method, input data related to a current block in a current picture is received at a video encoder side or a video bitstream corresponding to compressed data including the current block in the current picture is received at a video decoder side. The current block is partitioned into a first region and a second region using a target partition selected from a partition set comprising triangle partition. A candidate list is determined. A first candidate for the first region and a second candidate for the second region are determined by selecting two target candidates from the candidate list. When a selected target candidate is a uni-prediction candidate, the selected target candidate is used as the first candidate or the second candidate; and when the selected target candidate is a bi-prediction candidate, motion information associated of the selected target candidate with List 0 or List 1 is used as the first candidate or the second candidate. The current block or current motion information associated with the current block is encoded using a triangle Merge mode candidate list at the video encoder side, or decoding the current block or the current motion information associated with the current block using the triangle Merge mode candidate list at the video decoder side. The triangle Merge mode candidate list is used to derive the first candidate and the second candidate.

The candidate list for triangle Merge mode can be derived based on a normal Merge mode (also called a regular merge mode). In one embodiment, the motion information of the selected target candidate comprises motion vector and reference picture index of the selected target candidate.

In one embodiment, indices for the first candidate and the second candidate are signalled at the video encoder side or parsed at the video decoder side.

In one embodiment, after the first region and the second region are encoded or decoded according to the first candidate and the second candidate, a weighting process is applied to an adjacent edge of the current block.

BRIEF DESCRIPTION OF THE DRAWINGS

FIG. 1 shows the neighbouring PUs used to derive the spatial and temporal MVPs for both AMVP and Merge scheme.

FIG. 2 illustrates an example of the derivation process for combined bi-predictive Merge candidate.

DETAILED DESCRIPTION OF THE INVENTION

Figure 3:
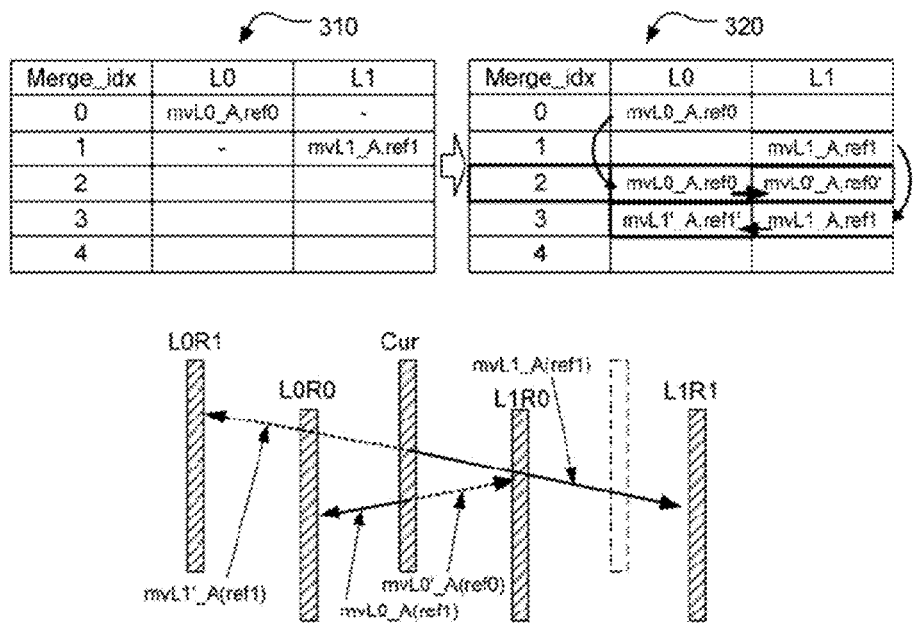
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.
Figure 4A:
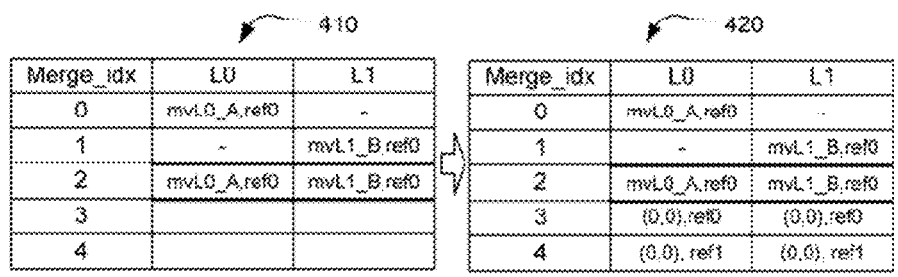
FIG. 4A illustrates an example of adding zero vector Merge candidates, where the candidate list on the left corresponds to an original Merge candidate list and the candidate list on the right corresponds to the extended Merge candidate list by adding zero candidates.
Figures 4B, 5:
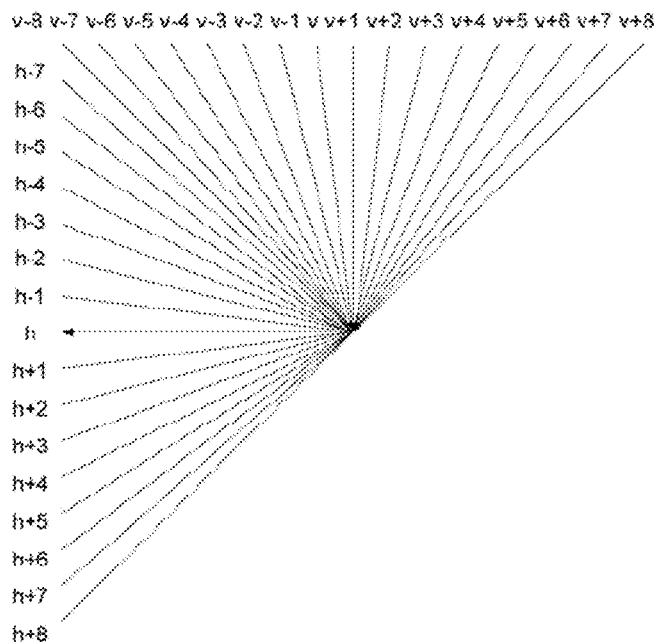
FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
FIG. 5 illustrates the 33 directional Intra prediction mode as used by the HEVC (high efficiency video coding) standard.
Figure 6:
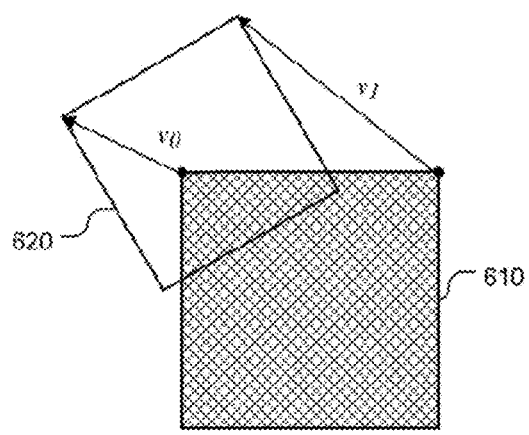
FIG. 6 illustrates an example of four-parameter affine model, where the motion model can be derived based on motion vectors at two control points.
Figure 7:
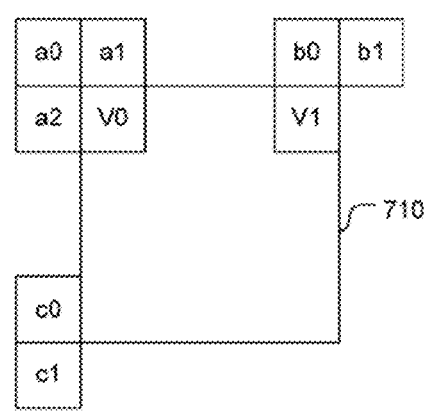
FIG. 7 illustrates the neighbouring block set used for deriving the corner-derived affine candidates.
Figure 8A:
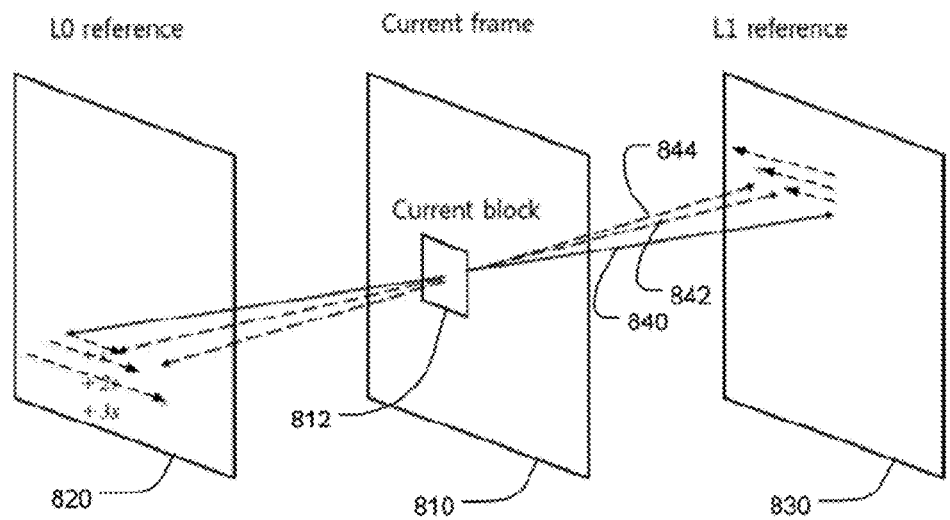
FIG. 8A illustrates an example of UMVE search process for a current block in the current frame.
Figure 8B:
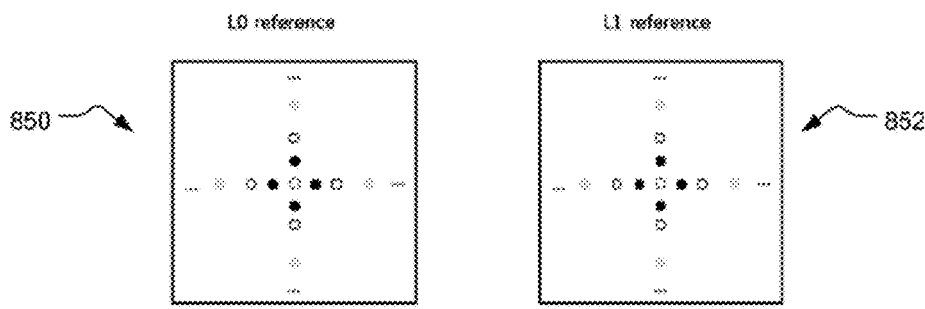
FIG. 8B illustrates an example of UMVE search at specific locations around the centre point vertically and horizontally for L0 reference and L1 reference.
Figure 9:
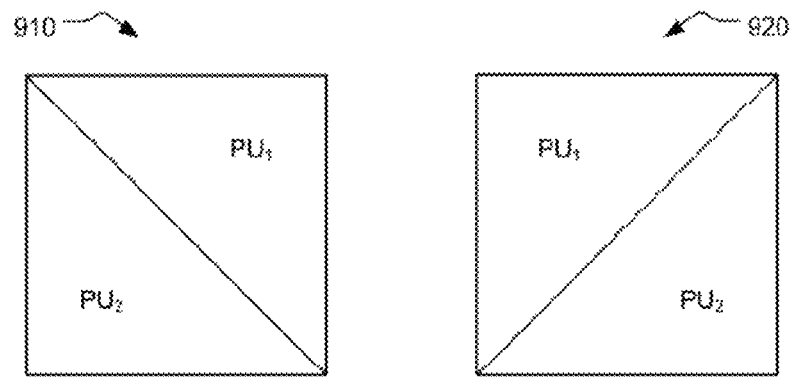
FIG. 9 illustrates an example of triangular partition mode, where a CU is partitioned into two triangular prediction units, in either diagonal or inverse diagonal direction.
Figure 10:
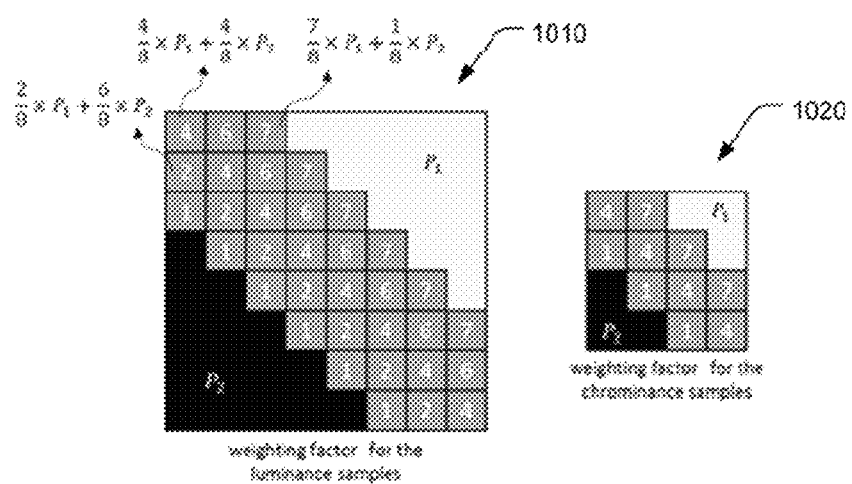
FIG. 10 illustrates an example of weighting for the luma block and weighting for the chroma block.

The following description is of the best-contemplated mode of carrying out the invention. This description is made for the purpose of illustrating the general principles of the invention and should not be taken in a limiting sense. The scope of the invention is best determined by reference to the appended claims.

The generation process of the candidate list for triangle Merge mode is very complex. Several pruning processes are involved. The candidate generation has heavy data dependency and hard to speed up. In this invention, it is proposed to generate a first candidate list first and generate a second candidate list as the candidate list for triangle Merge mode or the extensions of triangle Merge mode. Alternatively, it is proposed to use the first candidate list and/or signalled candidate indices to generate the motion information for the first region and the second region for triangle Merge mode or the extensions of triangle Merge mode. In one example, the first candidate list can be the normal Merge candidate list. To be specific, assuming that there are two kinds of Merge candidate lists employed in a video coding system. One Merge candidate list, including spatial merging candidates (spatial MVPs from spatial neighbouring CUs), temporal merging candidates (temporal MVP from one of collocated CUs), pairwise average merging candidates, zero motion vector merging candidates, history-based merging candidates or more merging candidates, is for the normal Merge mode (also referred to as regular merge mode). In an example, when a regular merge flag associated with the current block is true (e.g. regular_merge_flag=true), the Merge candidate list for the normal merge mode (i.e., the normal Merge candidate list) is generated for coding the current block. The other Merge candidate list employed in the video coding system is for the Merge mode containing different motion information for the sub-blocks partitioned from the current block. For example, when the merge subblock flag associated with the current block is true (e.g. merge_subblock_flag=true), the Merge candidate list for the sub-block merge mode is generated for coding the current block. The present invention proposes generating the motion information for the two regions of the current block coded in the triangle Merge mode or the extensions of triangle Merge mode based on the normal Merge candidate list. In this way, the circuit and resource of generating the normal Merge candidate list can be reused. The motion information can include motion vectors and reference picture index.

For the case that a second candidate list is generated for triangle Merge mode or the extensions of triangle Merge mode, the second candidate list is, for example, generated by modifying the first candidate list. For triangle Merge mode, the second candidate list is used. In one embodiment, the uni-prediction candidate is preserved and keeps unchanged. The bi-prediction candidate is modified to be a uni-prediction candidate. For example, the List_0 motion information is preserved and the List_1 motion information is set as unavailable. The bi-prediction candidate is modified as a List_0 uni-prediction candidate. In another example, the List_1 motion information is preserved and the List_0 motion information is set as unavailable. The bi-prediction candidate is modified as a List_1 uni-prediction candidate. In another example, in general bi-prediction picture (GBP), the List_1 motion information is preserved and the List_0 motion information is set as unavailable. The GBP refers to pictures with the PoCs (Picture order Counts) of all the reference pictures smaller than the PoC of the current picture.

In non-GBP picture or P-slice picture, the List_0 motion information is preserved and the List_1 motion information is set as unavailable. In another example, in general bi-prediction picture (GBP), the List_0 motion information is preserved and the List_1 motion information is set as unavailable. In non-GBP picture or P-slice picture, the List_1 motion information is preserved and the List_0 motion information is set as unavailable. In another example, the motion information with smaller delta PoC (e.g. the closer reference picture to the current picture) is preserved and the motion information with larger delta PoC set as unavailable. In another example, the motion information with larger delta PoC (e.g. the farer reference picture to the current picture) is preserved and the motion information with smaller delta PoC set as unavailable.

In another embodiment, the uni-prediction candidate is preserved and keeps unchanged. For the bi-prediction candidate, one of the motion information is used to generate a decision. According to the decision, one of the motion information is preserved and the other motion information is set as unavailable. For example, according to the first/second candidate index, to preserve which of the motion information and to set which of motion as unavailable for the first/second region are decided. For example, the List_0 motion information is used for pruning process. If the List_0 motion information already exists in the second candidate list, the List_1 motion information is used for this candidate and the List_0 motion information is set as unavailable. In another example, if the List_0 motion information is the same as the first List_0 motion information in the second candidate list, the List_1 motion information is used for this candidate and the List_0 motion information is set as unavailable. In another example, if the List_0 motion information is the same as the last List_0 motion information in the second candidate list, the List_1 motion information is used for this candidate and the List_0 motion information is set as unavailable.

In another embodiment, each motion information in the first candidate list is put into the second candidate list one by one. The order can be put all the List_0 motion information first then put all the List_1 motion information. Another order can be put the List_0 motion information of a candidate, then the List_1 motion information of this candidate, then the next candidate, and so on. For the second candidate list, only the uni-prediction candidate can be inserted. Before inserting a candidate, the full pruning or partial pruning process can be applied. If there is no redundant, the candidate can be put into the second candidate list. The pruning can be performed with the candidate already in the list with the same reference list. The pruning can also be performed with the candidates with the different reference list. For example, MV and PoC can be used as input for pruning.

In another embodiment, each motion information in the first candidate list is put into the second candidate list one by one. The order can be put all uni-prediction candidate into the second candidate list first, then put the bi-prediction candidates. When inserting the candidate into the candidate list, the full pruning or partial pruning process can be applied. For the bi-prediction candidate, it can be divided into two uni-prediction candidates by picking one motion information or modifying the bi-prediction candidate to a uni-prediction candidate and the insertion is performed accordingly. The above mentioned method can be applied. In one example, for bi-prediction candidate, the List_0 motion information is used for pruning process. If it is redundant, the List_1 motion information is preserved and the List_0 motion information is set as unavailable. Otherwise, the List_0 motion information is preserved and the List_1 motion information is set as unavailable. In other example, for bi-prediction candidates, the List_0 motion information are inserted first then the List_1 motion information. During the insertion, the pruning process can be applied.

For the case that the first candidate list is used for triangle Merge mode or the extensions of triangle Merge mode, the first candidate list can be used for triangle Merge mode even when there are some bi-prediction candidates in the first candidate list. For triangle Merge mode, two candidate indices are signalled or parsed for the first region and the second region associated with the current block. Two candidates in the first candidate list are selected for these two regions. If both selected candidates are all uni-prediction candidates, these two uni-prediction candidates are used for these two regions. If one selected candidate is uni-prediction and the other one is bi-prediction, the bi-prediction candidate is modified as a uni-prediction candidate. Several methods can be applied. For example, List_0 or List_1 motion information can be picked. In another example, the redundancy check can be performed for the uni-prediction candidate and the motion information of the bi-prediction candidate with the same reference list. If it is redundant, the motion information of the bi-prediction candidate with the different reference list is preserved. In another example, the redundancy check can be performed for the uni-prediction candidate and both of the motion information of the bi-prediction candidate.

The PoC and MV can be used for the pruning process. If it is redundant, the motion information of the bi-prediction candidate that is different from the uni-prediction candidate is preserved. If both candidates are bi-prediction candidates, the pruning process of candidate1-List_0 with candidate2-List_0, candidate1-List_1 with candidate2-List_1, candidate1-List_0 with candidate2-List_1, candidate1-List_1 with candidate2-List_0, or any combination of the above pairs are performed. The pruning process of candidate1-List_0 with candidate2-List_0 refers to the case that candidate1-List_1 is used for the first region if candidate1-List_0 is the same as candidate2-List_0. The pruning process of candidate1-List_1 with candidate2-List_1 refers to the case that candidate1-List_0 is used for the first region if candidate1-List_1 is the same as candidate2-List_1. Similar meaning can be applied to other examples.

A pair check order can be predefined. For example, the following orders can be used:
 {candidate1-List_0 with candidate2-List_0→candidate1-List_1 with candidate2-List_1→candidate1-List_0 with candidate2-List_1→candidate1-List_1 with candidate2-List_0},
 {candidate1-List_0 with candidate2-List_0→candidate1-List_0 with candidate2-List_1→candidate1-List_1 with candidate2-List_1 with candidate2-List_1→candidate1-List_1 with candidate2-List_0},
 {candidate1-List_0 with candidate2-List_0→candidate1-List_0 with candidate2-List_1→candidate1-List_1 with candidate2-List_0→candidate1-List_1 with candidate2-List_1}, or
 {candidate1-List_0 with candidate2-List_0→candidate1-List_1 with candidate2-List_1}.

The first motion information pair without redundancy is used. If all pairs are redundant, a predefined pair can be selected. For example, candidate1-List_0 with candidate2-List_0, or one of the motion information can be modified to be different from the other motion information.

In another embodiment, the first candidate list can be used for triangle Merge mode even when there are some bi-prediction candidates in the first candidate list. For triangle Merge mode, two candidate indices are signalled or parsed for the first region and the second region. Two candidates in the first candidate list are selected for these two regions. If the selected candidate is bi-prediction candidate, it is modified to be uni-prediction candidate. In one example, for the selected first candidate, if it is bi-prediction candidate, the List_0 motion information is preserved and the List_1 motion information is set as unavailable. For the selected second candidate, if it is bi-prediction candidate, the List_1 motion information is preserved and the List_0 motion information is set as unavailable. In another example, for the selected first candidate, if it is bi-prediction candidate, the List_1 motion information is preserved and the List_0 motion information is set as unavailable. For the selected second candidate, if it is bi-prediction candidate, the List_0 motion information is preserved and the List_1 motion information is set as unavailable.

In the above method, for modifying bi-prediction to uni-prediction or to make the motion information different from the candidate already in the list, a predefined or derived MV offset can be added to the target motion information or selected motion information to make the target motion different from the motion information in the candidate list or make the selected motion information different from each other. For example, in the above methods, after generating the second candidate list for triangle Merge mode or other Merge mode, generating a triangle Merge mode candidate list, reusing the first candidate list, after deriving two candidates or after deriving two selected uni-prediction candidates, the pruning process can be applied to these two selected candidates or these two selected uni-prediction candidates. If these two candidates or these two uni-prediction candidates are the same, one candidate can be modified to be different from the other candidate.

In one example, it is proposed to modify the motion information by adding an offset to the motion vectors of cand1 or cand2 to make them different. Another example is to mirror cand1 or cand2. In another example, the motion information of the second region can be modified by a process. For example, modified process may correspond to adding some predefined or derived MV/MV-offset on the motion information, or mirror/scale the motion information to another reference list and/or another reference picture. The offset MV can be (N, 0), (−N, 0), (0, N), or (0, −N), where N can be 1 in integer pel, quarter pel (e.g. 1/4-pel), 1/2-pel, 1/8-pel, 1/16-pel, 2-pel, 4-pel or any predefined value. The offset MV can be (N, N), (−N, −N), (N, −N), or (−N, N), where N can be 1 in integer pel, quarter pel (e.g. 1/4-pel), 1/2-pel, 1/8-pel, 1/16-pel, 2-pel, 4-pel or any predefined value. The offset MV can be (N, M), (−N, −M), (N, −M), or (−N, M), where N and M can be 1 in integer pel, quarter pel (e.g. 1/4-pel), 1/2-pel, 1/8-pel, 1/16-pel, 2-pel, 4-pel or any predefined value. In one specific example, if the selected first and second candidates are the same, the MV offset of (1/4-pel, 0) is added to the second candidate. For pruning process, it will only compare the same reference list motion information. For example, List_0 motion information of candidate 1 is compared with the List_0 motion information of candidate 2, not compared with the List_1 motion information of candidate 2. In another example, for the pruning process, it can compare the motion information in different reference list. For example, List_0 motion information of candidate 1 can be compared with the List_1 motion information of candidate 2. The MVs and the PoCs of the reference pictures are used for pruning. If the PoCs of the two selected candidates are the same and the MVs of the two selected candidates are the same, they are equivalent. In one embodiment, if the two selected candidates are equivalent, the MV offset of (1/4-pel, 0) is added to the second candidate.

Any combination of above can be applied to any Multi-hypothesis mode such as MH mode for Merge or MH mode for Inter or MH mode for Intra.

Any of the foregoing proposed methods can be implemented in encoders and/or decoders. For example, any of the proposed methods can be implemented in an Inter/Intracoding module of an encoder, a motion compensation module, a Merge/Inter/Intracandidate derivation module of a decoder. Alternatively, any of the proposed methods can be implemented as a circuit coupled to the Inter/Intracoding module of an encoder and/or motion compensation module, a Merge/Inter/Intracandidate derivation module of the decoder.

Figure 11:
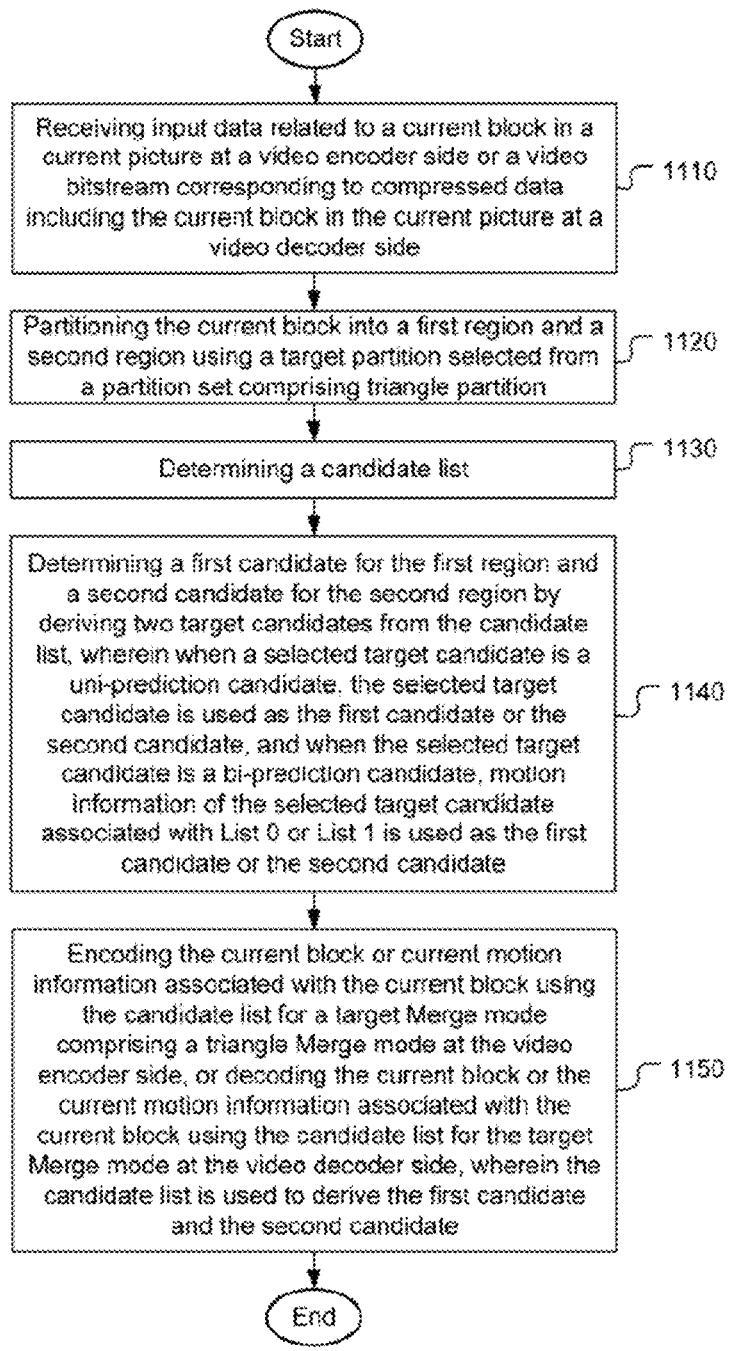
FIG. 11 illustrates a flowchart of an exemplary Inter prediction for video coding using the triangle partition mode according to an embodiment of the present invention.

FIG. 11 illustrates a flowchart of an exemplary Inter prediction for video coding using the triangle Merge mode according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture is received at a video encoder side or a video bit stream corresponding to compressed data including the current block in the current picture is received at a video decoder side in step 1110. The current block is partitioned into a first region and a second region using a target partition selected from a partition set comprising triangle partition in step 1120. As mentioned previously, the triangle partition is from the left-top corner to the right-bottom corner of the current block or from the right-top corner to the left-bottom corner of the current block. However, the present invention is not limited to the diagonal partition line. The present invention can also applied to the partition set resulted from a partition line corresponding to any angle and/or a distance between the partition straight line and CU center. A candidate list is determined in step 1130. A first candidate for the first region and a second candidate for the second region are determined by deriving two target candidates from the candidate list in step 1140, wherein when a selected target candidate is a uni-prediction candidate, the selected target candidate is used as the first candidate or the second candidate, and when the selected target candidate is a bi-prediction candidate, motion information of the selected target candidate associated with List_0 or List_1 is used as the first candidate or the second candidate. The current block or current motion information associated with the current block is encoded or decoded using the candidate list for a target Merge mode comprising a triangle Merge mode at the video encoder side in step 1150, wherein the candidate list is used to derive the first candidate and the second candidate.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for a video coding system, comprising:
receiving input data associated with a current block in a current picture;
generating a candidate list for the current block coded or to be coded by a partitioning prediction mode;
selecting a first merge candidate and a second merge candidate from the generated candidate list;
generating a candidate pair based on the first merge candidate and the second merge candidate, comprising:
when the first merge candidate is bi-prediction, using motion information of the first merge candidate associated with either a first reference list or a second reference list as a first candidate of the candidate pair;
when the first merge candidate is uni-prediction, using an available motion information of the first merge candidate as the first candidate of the candidate pair;
when the second merge candidate is bi-prediction, using motion information of the second merge candidate associated with either a first reference list or a second reference list as a second candidate of the candidate pair; and
when the second merge candidate is uni-prediction, using an available motion information of the second merge candidate as the second candidate of the candidate pair;

after generating the candidate pair, deriving a first prediction based on a motion vector of the first candidate and deriving a second prediction based on a motion vector of the second candidate, wherein the second prediction is derived based on the motion vector of the second candidate and a predefined motion vector offset;

generating a combined prediction based on the first prediction, the second prediction, a partition of the current block, and a weighting process; and coding the current block based on the combined prediction.

2. An apparatus in a video coding system, comprising:
processing circuitry configured to:
receive input data associated with a current block in a current picture;
generate a candidate list for the current block coded or to be coded by a partitioning prediction mode;
select a first merge candidate and a second merge candidate from the generated candidate list;
generate a candidate pair based on the first merge candidate and the second merge candidate, comprising:
when the first merge candidate is bi-prediction, using motion information of the first merge candidate associated with either a first reference list or a second reference list as a first candidate of the candidate pair;
when the first merge candidate is uni-prediction, using an available motion information of the first merge candidate as the first candidate of the candidate pair;
when the second merge candidate is bi-prediction, using motion information of the second merge candidate associated with either a first reference list or a second reference list as a second candidate of the candidate pair; and
when the second merge candidate is uni-prediction, using an available motion information of the second merge candidate as the second candidate of the candidate pair;
after generating the candidate pair, derive a first prediction based on a motion vector of the first candidate and derive a second prediction based on a motion vector of the second candidate, wherein the second prediction is derived based on the motion vector of the second candidate and a predefined motion vector offset;
generate a combined prediction based on the first prediction, the second prediction, a partition of the current block, and a weighting process; and
code the current block based on the combined prediction.

3. The method of claim 1, wherein a horizontal component or a vertical component of the predefined motion vector offset is 0, a predefined positive value, or a predefined negative value.

4. The method of claim 1, wherein a horizontal component or a vertical component of the predefined motion vector offset is integer-pel, sub-pel, 2-pel, or 4-pel.

5. The method of claim 1, wherein the motion vector of the second candidate is modified by the predefined motion vector offset to derive a modified motion vector, and the second prediction is derived based on the modified motion vector.

6. The method of claim 1, wherein the partition of the current block is defined by an angle and a distance.

* * * * *